United States Patent Office 3,051,642
Patented Aug. 28, 1962

3,051,642
HETEROGENEOUS NUCLEAR REACTOR FUEL ELEMENT CHARGING AND DISCHARGING MEANS
Kenneth Henry Dent, Cuddington, near Northwich, England, assignors to United Kingdom Atomic Energy Authority, London, England
Filed Aug. 6, 1957, Ser. No. 676,652
Claims priority, application Great Britain Aug. 14, 1956
3 Claims. (Cl. 204—193.2)

This invention relates to heterogeneous nuclear reactors and it is concerned with means for charging and discharging fuel elements into and out from the core of such reactors.

A heterogeneous nuclear reactor is invariably contained within a massive shield and, sometimes in addition, within a steel pressure vessel. Access holes are provided through the shield (and pressure vessel where existing) in order to allow for the charging and discharging of fuel elements into and out from the core of the reactor and for the operation of control and shut off rods. The number of holes that can be provided in a shield or a pressure vessel are limited both by consideration of strength of the perforated structure and the manufacturing objection of providing the holes and strengthening the residual structure. One access hole and one discharge hole per fuel element channel in the reactor core may be provided (see the British BEPO unpressurised reactor) but is at the present time undesirable and even impossible where a pressure vessel exists. As an alternative one access hole for groups of four fuel element channels may be provided with a pivotted rigid charging snout movable over the four channels.

It is an object of the present invention to provide a charging/discharging device for a heterogeneous nuclear reactor adapted to service a large number of fuel element channels in the core of the reactor.

It is also an object of the invention to provide a charging/discharging device for a heterogeneous nuclear reactor whereby charging and discharging can take place from a single face of the reactor.

According to the invention a charging/discharging device for a pressurised gas cooled heterogeneous nuclear reactor comprises a pillar having at one end a locating spigot and at the other end means for locating the pillar at the lower end of a charge tube passing through the shield of a nuclear reactor, said means for locating the pillar in the charge tube including a rotatable chute passing through the charge tube, a second chute coupling with the rotatable chute and pivotted at its coupling with the rotatable chute so that it has a lower free end movable radially outwards from said pillar, means for rotating said rotatable chute about its axis together with said second chute and means for moving said second chute radially outward from the pillar.

One embodiment of the invention will now be described by way of example with reference to the accompanying drawings.

FIG. 6 is a section at the line VI—VI in FIG. 4.

Figure 1:
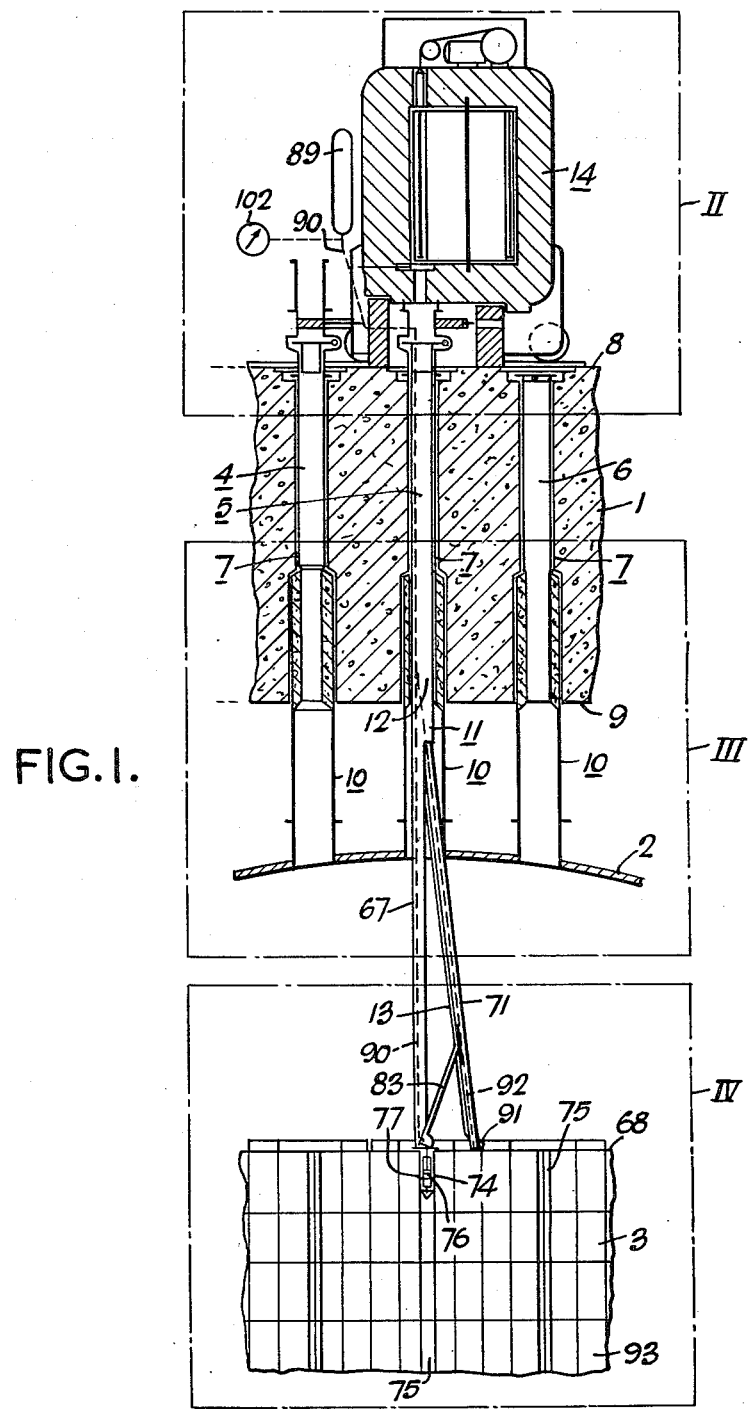
FIG. 1 is a schematic sectional elevation through part of the radiation shield, the pressure vessel and the core of a graphite moderated heterogeneous nuclear reactor.

FIG. 1 in general shows part of the fabric of a graphite moderated heterogeneous nuclear reactor. Part of the concrete radiation shield 1, the pressure vessel 2 and the graphite core 3 are shown. The radiation shield 1 is penetrated by three access holes 4, 5 and 6 each comprising an aperture 7 extending between the upper charge face 8 and the underside 9 of the radiation shield 1, and a charging/discharging tube 10 which extends through the aperture 7 to the pressure vessel 2. A rotatable charging chute 11 is located in the charging/discharging tube 10 of the access hole 5. The charging/discharging chute 11 comprises a pillar 67 integral with an upper vertical chute 12 connecting with a lower pivotted chute 13. A discharge flask 14 is shown in position above the access hole 5 which is in a condition for a discharging or charging operation to be carried out.

Figure 2:
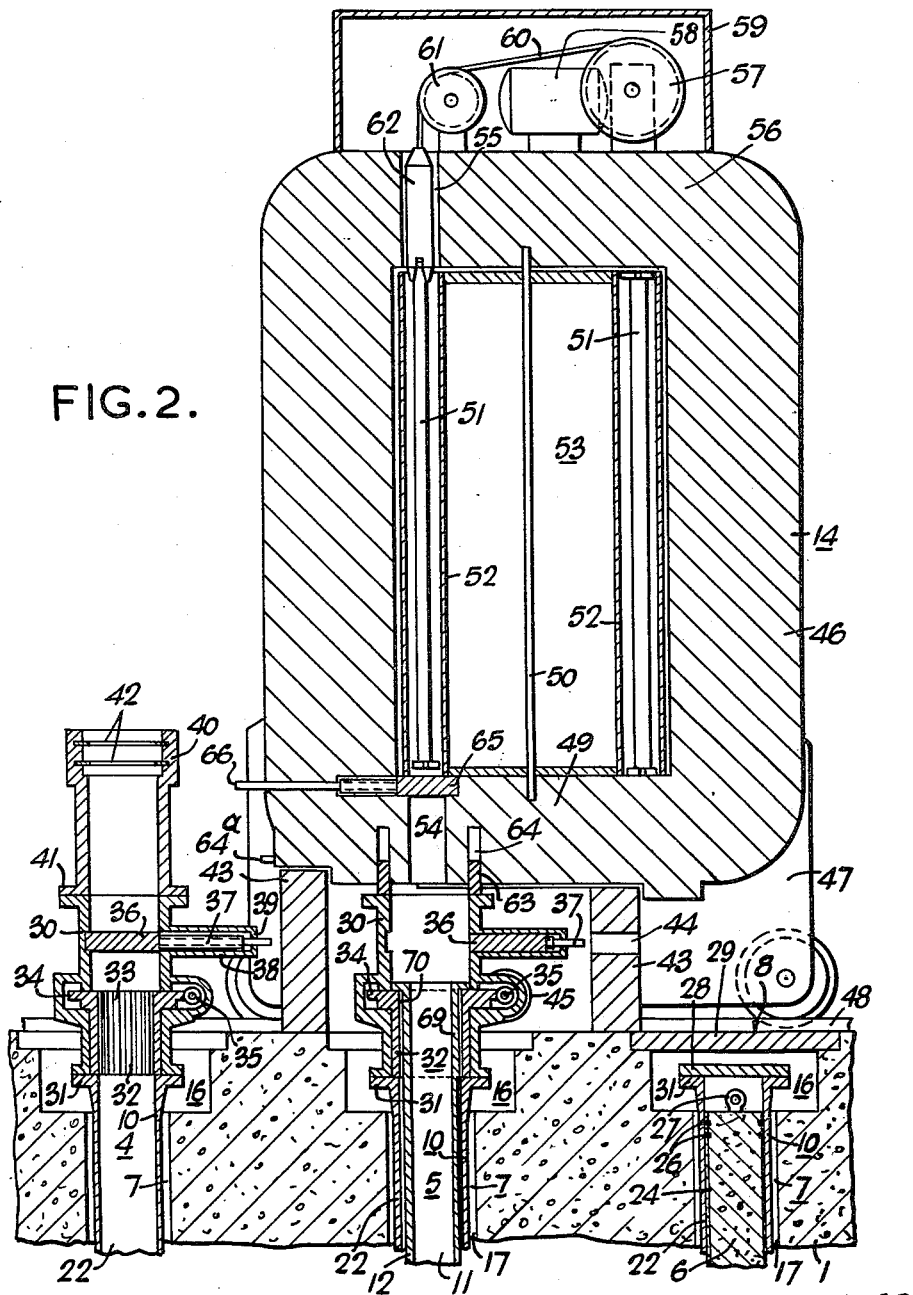
FIG. 2 shows in sectional elevation and on an enlarged scale that part of FIG. 1 embraced by the chain dotted rectangle II.
Figure 3:
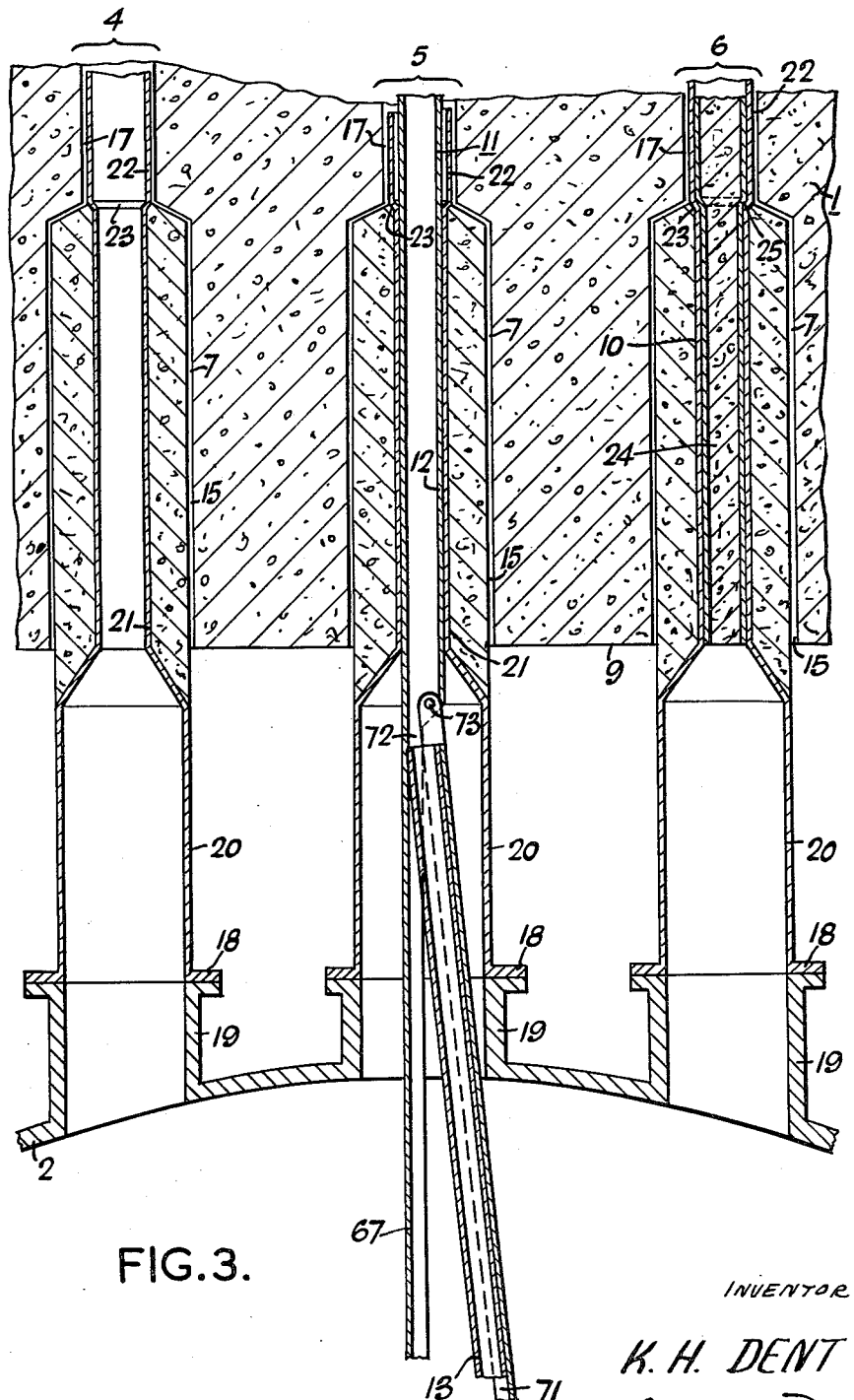
FIG. 3 shows in sectional elevation and on an enlarged scale that part of FIG. 1 embraced by the chain dotted rectangle III.

Referring now to FIGS. 2 and 3 in combination with FIG. 1, the apertures 7 of the access holes 4, 5 and 6 are stepped in three parts, namely a lower part 15 of circular cross section open to the underside 9 of the radiation shield 1, a short upper part 16 open to the charge face 8 of the shield 1 and a centre part 17 of smaller diameter than the parts 15 and 16. The charging/discharging tubes 10 are bolted by means of an integral end flange 18 to flanged access ports 19 of the pressure vessel 2. The charging/discharging tubes 10 have a lower tubular part 20 connecting with a centre tubular part 21 of smaller diameter than the part 20, the part 21 connects with an upper tubular part 22 of slightly larger diameter. The upper part 22 has an external end flange 31 and connects with the part 21 through an internal conical seating 23.

In the access hole 6 the charging/discharging tube 10 contains a tubular metal shield plug 24 filled with concrete. The shield plug 24 has a conical seating 25 complementary to the internal conical seating 23 of the charging/discharging tube 10, a pair of rubber sealing rings 26 and a lifting eye 27. The charging/discharging tube 10 is shown closed at its upper end by a plate 28 and the aperture 16 is closed by a plate 29.

In the access hole 4 the preliminaries to a discharging operation have taken place. The cover plates 28, 29 and the shield plug 24 have been removed. A lower gland tube 30 is shown bolted to the upper end of the charging/discharging tube 10 at the flange 31. The lower gland tube 30 contains a rotatably mounted tubular member 32 having internal longitudinal keyways 33 and an external gear 34. A worm 35 mounted on the gland tube 30 engages with the gear 34 and is provided with a drive shaft passing through the wall of the gland tube 30. The gland tube 30 also contains a gate valve 36 operated by the rotation of a threaded rod 37 which is mounted on the gland tube 30 in a housing 38. The threaded rod 37 passes out of the housing 38 through a seal 39. An upper gland tube 40 is bolted to the lower gland tube 30 by an integral flange 41. The upper gland tube 40 has two internal rubber sealing rings 42.

In the access hole 5 a discharging operation is taking place. The tube 10 has a lower gland tube 30 identical to the lower gland tube 30 at the access point 4, bolted in position with a thick shielding ring 43 located on the charge face 8 of the shield 1 and surrounding the lower gland tube 30. Operating apertures 44, 45 for the gate valve 36 and the worm 35 are located passing through the wall of the shielding ring 43. The discharge flask 14 comprising a thick walled container 46 is mounted on a bogie 47 running on rails 48. The discharge flask 14 has a base plate 49 and contains a rotatable fuel element magazine 53. Discharged fuel elements 51 are shown in containers 52 situated around the circumference of the magazine 53. The magazine 53 is rotatable on a spindle 50 to bring each empty container 52 in turn into a position between an aperture 54 in the base plate 49 and a hole 55 passing through the top 56 of the container 46. A cable winding drum 57 geared to be driven by a motor 58 is situated on top of the discharge flask 14 within a housing 59. A winding cable 60 passes from the drum 57 over an idler pulley 61 then through the hole 55 to a fuel element grab 62 suspended from the cable 60. The discharge flask 14 is located above the access hole 5 with the base plate aperture 54 above the mouth of the charging/discharging tube 10. A sealing ring 63 which can be lowered by rotation of a shaft 64a from a housing slot 64 in the base of the discharge flask 14 seals between the discharge flask 14 and the mouth of the lower gland tube 30. A gate valve 65 for sealing the aperture 54 is movable under the action of a threaded rod 66.

Figure 4:
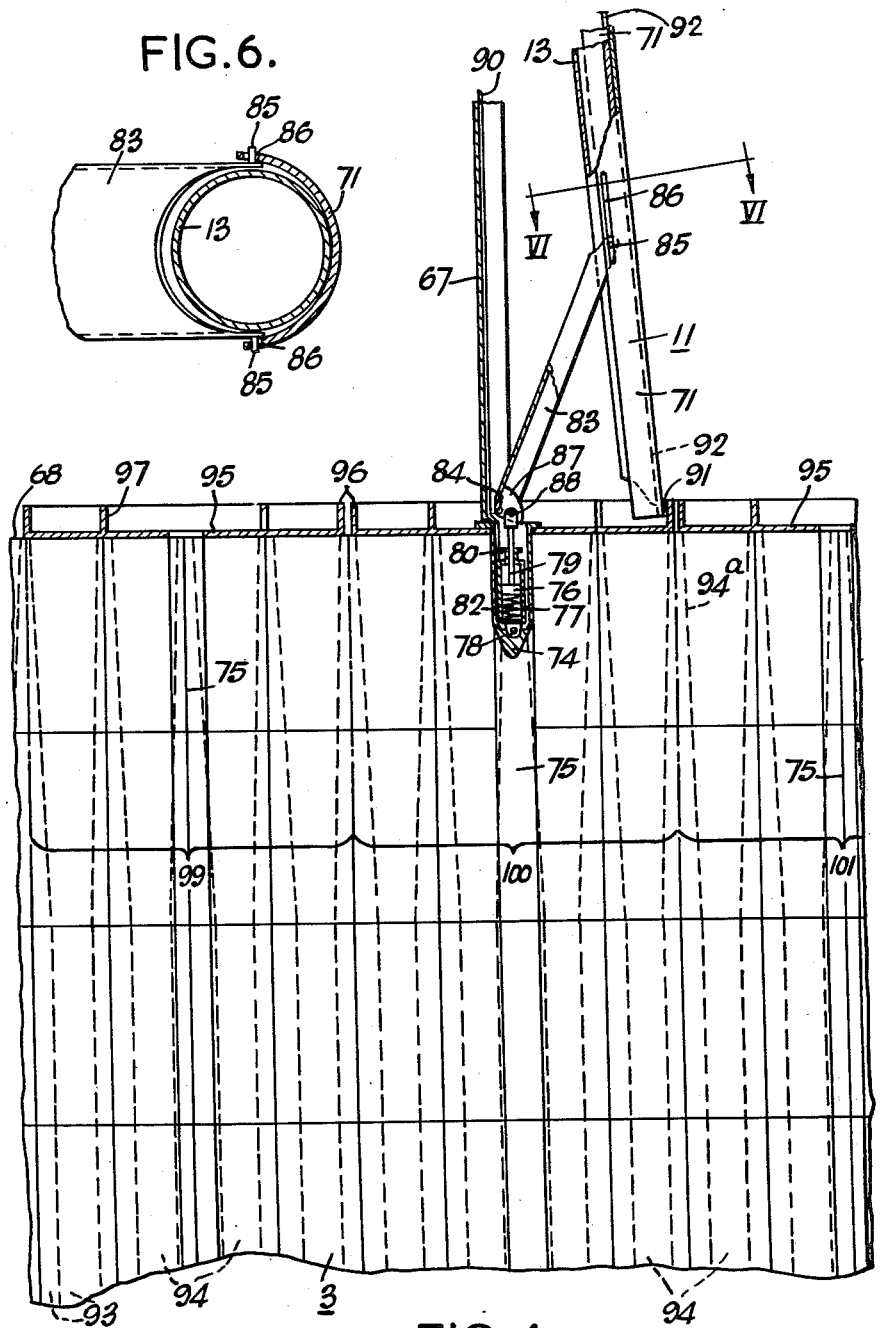
FIG. 4 shows in sectional elevation and on an enlarged scale that part of FIG. 1 embraced by the chain dotted rectangle IV, (also a section along the line IV—IV of FIG. 5).

Referring to FIGS. 2, 3 and 4 in combination the charging chute 11 shown in position in the access hole 5 comprises a pillar 67 integral with an upper vertical chute 12 connecting with a lower pivotted chute 13. The pillar 67 extends downwards to the upper face 68 of the core 3 (FIG. 4) of the reactor from the upper chute 12. The upper chute 12 is located with its upper end 69 held within the rotatable member 32 of the lower gland tube 30 (FIG. 2). The upper chute 12 has longitudinal splines 70 at its upper end 69 which engage with the internal keyways 33 of the rotatable member 32. The pivotted chute 13 is carried by a supporting member 71 (FIGS. 3 and 4) pivotted at the lower end 72 of the upper chute 12 (FIG. 3). The supporting member 71 is of curved semi-circular section complementary to the pillar 67 and is pivotted on the upper chute 12 by trunnions 73 (FIG. 3).

Referring to FIG. 4 the pillar 67 has a hollow spigot 74 at its lower end. The spigot 74 is located in a control rod channel 75 passing through the graphite core 3 and contains a piston 76 and cylinder 77 combination. The cylinder 77 is loosely mounted inside the spigot 74 by a pin 78 and a connecting rod 79 attached to the piston 76 passes out of the cylinder 77 through a gland 80. The piston 76 is normally held against the gland end of the cylinder 77 by a compression spring 82. A connecting link 83 connects the pillar 67 to the supporting member 71. The connecting link 83 is pivotted at the foot of the pillar 67 by a pivot pin 84 and is connected with the supporting member 71 by two pins 85 which slide in longitudinal slots 86 in the supporting member 71. The connecting link 83 is of semi-circular curved section and is pivotted on the pillar 67 by the pivot pin 84 and a plate 87 welded at the pillar end of the connecting link 83. The connecting rod 79 is connected to the free end of the plate 87 by a pin 88. Referring to FIG. 1 pressurised gas is supplied from a supply point 89 on the upper charge face 8 of the shield 1 to the cylinder 77 through a pipe 90 passing down the upper chute 12 and the pillar 67 of the chute 11. Referring to FIG. 4, a push-button valve 91 at the free end of the lower chute supporting member 71 normally closes a pipe 92 which passes up the supporting member 71 and the upper chute 12 to join the pipe 90 and a pressure gauge 102 on the upper charge face 8 of the shield 1 visible to the operator.

Figure 5:
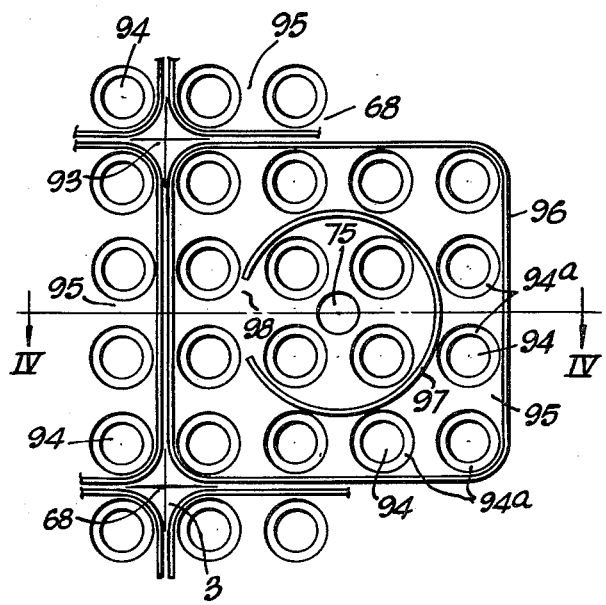
FIG. 5 is a plan of part of the core of the reactor.

Part of the graphite core 3 of the reactor is shown in FIG. 4. The core 3 is built from graphite blocks 93 and has fuel element channels 94 with tapered entries 94a and control rod channels 75. FIG. 5 is a plan of part of the upper charge face 68 of the core 3 and shows how the fuel element channels 94 are arranged on a symmetrical square lattice. The channels are divided into groups of sixteen. Each group of sixteen channels 94 is covered by a perforated plate 95 having a continuous square outer flange 96 surrounding the sixteen channels 94 and an inner circular flange 97 with a gap 98 surrounding the inner four channels 94. Each of the groups of sixteen channels has a central control rod channel 75.

Referring again to FIG. 4, the section of this figure is along three groups of channels 94 as indicated by the line IV—IV of FIG. 5. The groups of channels 94 shown in FIG. 4 are numbered 99, 100, 101 and are associated with the access holes 4, 5, and 6 respectively.

FIG. 6 which is a section of the supporting member 71 and the lower pivotted chute 13 at the line VI—VI of FIG. 4 shows the semi-circular form of the connecting link 83 and the supporting member 71 and the mode of engagement of the connecting link 83 with the supporting member 71 (i.e. the engagement of the pins 85 with the slots 86 in the supporting member 71).

The use of the charging/discharging chute will now be described in particular reference to the operation of discharging a group of channels, reference will be made to the drawings in the course of the description.

During normal operation of the reactor all the charging/discharging tubes 10, are either fitted with control rod operating mechanisms or are blocked with shield plugs 24 and covered by covers 28 which prevents the escape of gas from the reactor pressure vessel 2. (In FIG. 2 the access point 6 is shown with a shield plug 24 in position and with the cover plates 28 and 29 in position which is representative of the reactor operating condition.) The first step in the discharging operation is to reduce the pressure in the pressure vessel 2 to about 2″ water gauge. The cover plates 28 and 29 of the access hole are then removed and a lower gland tube 30 is bolted in position with the gate valve 36 open. (Operational access permissible with reactor shut down.) An upper gland tube 40 is now bolted in position (sealing at the low pressure of 2″ W.G. is obtained at the face 25 of the shield plug 24). A lifting hook is now engaged with the lifting eye 27 of the shield plug 24, to lift the shield plug 24. The lifting hook has a straight shank which is slidable in a gland at the centre of a circular flat plate associated with the hook. The lifting hook is engaged with the eye 27 of the shield plug and the flat plate embracing the shank of the lifting hook is located covering the open mouth of the upper gland tube 40. The shield plug 24 is lifted by means of the lifting hook the shank of which slides in the gland of the flat circular plate which seals the upper gland tube 40. The shield plug 24 is lifted through the gland tubes 30 and 40 until its lower end is above the gate valve 36 which can then be closed. The shield plug 24 has by this time reached the rubber sealing rings 42 in the upper gland tube 40 which seal against the escape of gas. The shield plug 24 is raised until its lower end is above the gate valve 36 which is then closed by rotating the rod 37, and the shield plug 24 is then removed completely. At this point the discharging operation has reached the stage as shown by the access point 4 of FIGS. 2 and 3.

The charging/discharging chute 11 is now brought into position to be lowered into the charging/discharging tube 10 of the access point. The charging/discharging chute 11 is held with the pivotted supporting member 71 closed against the pillar 67 so as to form a complete tube. The closed discharging/charging chute 11 is now lowered into the upper gland tube 40 until the lower ends of the pillar 67 and the pivotted supporting member 71 are sealed in the upper gland tube 40 by the rubber sealing rings 42.

The gate valve 36 is now opened and the chute is lowered until the spigot 74 is located in the central control rod channel 75 of the group of sixteen fuel element channels to be discharged. The gate valve 36 is now closed and the upper gland tube 40 is removed. The massive shielding ring 43 is now placed in position and connections for operating the gate valve 36 and the worm 35 from outside the ring 43 are made. The bogie 47 carrying the discharge flask 14 is brought into position along the rails 48 (and accurately located by markings on the rails 48) and the sealing ring 63 is lowered to seal between the hole 54 in the base of the discharge flask 14 and the mouth of the lower gland tube 30.

Pressurised gas is now passed from the supply point 89

(FIG. 1) down the pipe 90 (FIGS. 1 and 4) to the cylinder 77. The piston 76 is moved against the action of the compression spring 82 to pivot the connecting link 83 and swing the supporting link 71 until the button valve 91 on the end of the supporting link 71 strikes the inner circular flange 97 surrounding the inner four fuel element channels 94 to be discharged. The button valve 91 is opened when it strikes the flange 97 and the reading on the gauge 102 changes. Thus the reading of the gauge indicates that the supporting member 71 (and the lower chute 13) has swung into position against the flange 97. The charging/discharging chute is rotated by means of the worm 35 until the mouth of the pivotted chute 13 is located adjacent to one of the inner four fuel element channels 94, as shown by an indicator associated with the worm 35. The fuel element grab 62 is now lowered through that empty container 52 of the fuel element magazine 53 which is in position between the aperture 54 in the base plate 49 of the discharge flask 14 and the hole 55 in the top of the flask 14. The fuel element grab 62 is lowered through the charging/discharging chute 11 and thence down the fuel element channel 94 until a fuel element 51 can be picked up by the grab 62. The fuel element 51 is now raised until it is contained within the container 52 of the fuel element magazine 53. The gate valve 65 which has an upper surface flush with the base 49 of the flask 14 is closed, the fuel element 51 released and the fuel element grab 62 withdrawn until it is fully contained within the hole 55 in the top of the flask 14. The magazine 53 is now rotated to bring the next empty fuel element container 52 into position between the aperture 54 and the hole 55. The grab 62 is now lowered through this container 52 (after opening of the gate valve 65) to pick up another fuel element 51 from the same fuel element channel 94. The process is repeated until the fuel element channel 94 has been discharged. The charging/discharging chute 11 is now rotated by means of the worm 35 to the next of the four inner channels 94, the flange 97 acting as a guide. This fuel element channel 94 is now discharged. The process is repeated for the remaining two channels 94 of the centre group of four and pressure reduced to the cylinder 77. The charging/discharging chute 11 is then rotated by the worm 35 until the end of the pivotted chute 13 can pass through the gap 98 in the inner flange 97. Further gas pressure is applied to the piston 76 to swing the supporting link 71 until it is arrested by the flange 96. The mouth of the pivotted chute 13 is now moved over each of the outer twelve fuel element channels 94 in turn which are discharged as described above. When during the discharging operation the magazine 53 of the discharge flask 14 becomes full the discharge flask 14 is removed to a discharge point and the contained fuel elements 51 are removed and the empty flask 14 is returned to continue the discharging operation. When the discharging operation is completed a charge flask similar to the discharge flask 14 but of lighter construction is brought into position above the charge/discharge tube 10 for a charging operation.

The charge flask contains a rotatable magazine carrying new fuel elements 51 and these fuel elements are charged into the fuel element channels 94 previously discharged. The procedure of the charging operation is the reverse of the discharging operation just described, i.e., fuel elements are lowered from the magazine in the charge flask into the fuel element channels 94 while the mouth of the pivotted chute 13 is first swung over the outer twelve fuel element channels 94 and then over the inner four fuel element channels 94. After recharging of the inner four fuel element channels 94 the pivotted chute 13 is returned to the closed position by releasing the pressure to the cylinder 77 when the loading of the compression spring 82 causes the pivotted chute 13 to move to its closed position. The charging/discharging chute 11 can now be removed from the charge/discharge tube 10 and the tube 10 replugged.

I claim:

1. A charging/discharging device for a pressurised gas cooled heterogeneous nuclear reactor having a radiation shield and a pressure vessel comprising a pillar having at one end a locating spigot and at the other end means for locating the pillar at the lower end of a charge tube passing through the radiation shield and connecting with the pressure vessel of a nuclear reactor, said means for locating the pillar including a rotatable chute passing through the charge tube, a second chute coupling with the rotatable chute and pivotted at its coupling with the rotatable chute so that it has a lower free end movable radially outwards from said pillar, means for rotating said rotatable chute about its axis together with said second chute and means for moving said second chute radially outwards from the pillar.

2. A charging/discharging device for a pressurised gas cooled heterogeneous nuclear recator as claimed in claim 1 wherein said means for moving the second chute radially outwards comprises a gas operated piston and cylinder arrangement contained in the locating spigot and a connecting link between the piston and the second chute.

3. A charging/discharging device for a pressurised gas cooled heterogeneous nuclear reactor as claimed in claim 1 wherein the pillar and connecting link are of curved cross section to nestle with the pivotted chute so as to have overall closed dimensions allowing removal of the device through the charge tube.

References Cited in the file of this patent

UNITED STATES PATENTS

| 1,031,375 | Reis | July 2, 1912 |
| 1,831,196 | Read | Nov. 10, 1931 |
| 2,531,527 | Patterson | Nov. 28, 1950 |
| 2,863,815 | Moore | Dec. 9, 1958 |
| 2,930,744 | Shillitto et al. | Mar. 29, 1960 |

OTHER REFERENCES

Nucleonics, vol. 14, No. 12, December 1956, pages 522–523, 204/154.39.

Dent et al.: J. Brit. Nucl. Energy Conf., April 1957, pp. 146–155.